United States Patent Office 3,424,888
Patented Jan. 28, 1969

3,424,888
ELECTRIC CURRENT FEEDING DEVICE FOR
RESISTANCE WELDING
Heinz Sommeregger and Hans Gött, Graz, Steiermark,
Austria, assignors to EVG Entwicklungs-u. Verwertungs-Gesellschaft m.b.H., Graz, Steiermark, Austria,
a corporation of Austria
Filed Sept. 28, 1965, Ser. No. 490,967
U.S. Cl. 219—87                    5 Claims
Int. Cl. B23k 11/10

ABSTRACT OF THE DISCLOSURE

An electric current feeding device has electrodes and at least two pairs of bus bars; each bar is insulated from the others. Contact means can establish selectively a tap between any electrode and any of the bus bars.

The invention relates to resistance welding and relates more particularly to the resistance welding of wire grating, such as armatures for concrete, fences and the like; still more particularly, the invention relates to the resistance welding of such wire grating; and further still more particularly, it relates to the means for carrying out such resistance welding, including electric current feeding for that purpose.

The aforsaid gratings are nowadays manufactured on multiple spot resistance welding machines.

Reference is had to the co-pending applications Ser. No. 391,163, filed Aug. 21, 1964, and Ser. No. 470,291 filed July 7, 1965, by one of the instant applicants jointly with someone else.

In the present day manufacture of these wire gratings, there is usually applied a large amount of longitudinal wires, surmounted by cross wires, and then the crossings are spot welded by either single or double spot welding with current of such amperage that the cross wires are fused at the points of intersection with the longitudinal wires.

The longitudinal wires of these gratings, however, often will later on be subjected to stresses of different magnitude rendering it desirable to use sometimes in one and the same gratings longitudinal wires of different diameters side by side. Different wire thicknesses, however, require different welding voltages and welding time; and these requirements are either not met at all by welding machines now in use, or are met by them only at great cost.

Grate welding machines of present construction to meet the instant requirements are not only costly, as stated, but also have the further disadvantage that they are of unwieldy large size. Usually, existing welding machines of this type include welding transformers, usually three such transformers depending, however, on the number of phases of the multiphase network. These transformers conduct the current through long flexible cables to the electrodes. The electrodes for the welding of longitudinal wires of different thickness, however, must be fed from different transformers which have accordingly been adjusted in point of voltage and welding time. As the transformers usually need to be installed below the floor in order to position the plane on which the grates are manufactured at a convenient height easily observable by the operator, this construction leads to welding machines of relatively unwieldy size.

It is accordingly among the principal objects of the invention to provide for grate welding of grates with longitudinal wires of different diameters, at reasonable cost and in a convenient manner.

It is another object of the invention to provide for a device for the feeding of electric current to the electrodes of a multiple spot welding machine which includes the provision of pairs of bus bars, at least two pairs being arranged along each row of electrodes.

Grate welding machines are known which feed the electric current to the electrodes of the welding machines by means of bus bars rather than by the aforementioned flexible cables, and these bars are fed by a large amount of small transformers. In order to secure a symmetrical loading of the multiphase network, there are usually provided three groups of two bus bars each, so that each group is applied to one third of the width of the grate to be welded. The use of bus bars has the advantage that the welding machines can be constructed of lower height, and are easier to erect.

Present bus bar systems, however are deficient therein that they do not make it possible to weld grates with longitudinal wires fo different thickness, as for this there would be necessary to have available at any random point of the width of the grate, two different voltages, perhaps separated only by a few millimeters from each other, in order to complete the welding of a grate with two different thicknesses of longitudinal wires.

It is accordingly another object of the invention to provide for an electric current feeding device including bus bars that permit the disposal along the width of the grate welding machine of two or more electric voltages.

It is yet another object of the invention to provide for feeding to the electrodes across the entire width of the welding machine of electric current from any phase of a multiphase network, in order to assume an even loading of the network phases.

It is yet a further object of the invention to provide along each electrode row two or more pairs of bus bars, and each electrode is selectively connectable to a bus bar of each of these bus bar pairs.

It is still another object of the invention to provide for the selective adjustment among the individual pairs of bus bars of different welding voltages and/or current feeding times, independently of each other.

It is still a further object of the invention to provide for the electric interconnection of the individual pairs of bus bars by transformers to different phases of a multiphase network, irrespective of whether the previously mentioned voltage and time adjustments have been made to the same or to different values.

It is yet another object of the invention to subdivide longitudinally one or more or all of the pairs of bus bars alongside the row of electrodes, into two or more separate aligned sections.

It is still a further object of the invention to provide with the aforesaid bus bars electrode supporting riders to tap at any point along the bus bars the desired bus bar and hence the desired voltage as carried by said bus bars.

Further objects and advantages of the invention will be set forth in part in the following specification and in part will be obvious therefrom without being specifically referred to, the same being realized and attained as pointed out in the claims hereof.

The foregoing and other objects of the invention will be best understood from the following description of exemplifications thereof, reference being had to the accompanying drawings, wherein.

Figure 1:
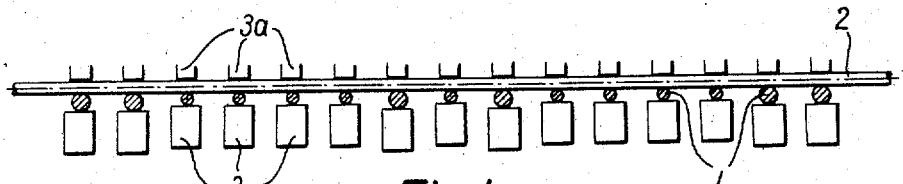
FIG. 1 is a fragmentary schematic vertical sectional view of a grate welding machine portion, taken along a crosswire, and showing the longitudinal wires in section.

In carrying the invention into effect in the embodiments which have been selected for illustration in the accompanying drawings and for description in this specification, and referring now particularly to FIG. 1, there is provided a row of electrodes 3 arranged adjacent each other along the width of a grate welding machine. On these electrodes 3 there are supported longitudinal wires 1 of different thickness, and all the longitudinal wires 1 of the grate are surmounted by transverse wires 2 of which one is shown in FIG. 1. Counter electrodes 3a are provided above the electrodes 3 which, if desired, may be constructed as passive current bridges in connection with double spot welding.

The instant invention provides for groups of pairs of bus bars, each carrying current of different voltage and welding time application, and an electrode at any point along the width of the grate is connectable to each, so that each electrode may selectively be fed that voltage and welding time that is needed for the particular thickness of the longitudinal wire it services.

Figure 2:
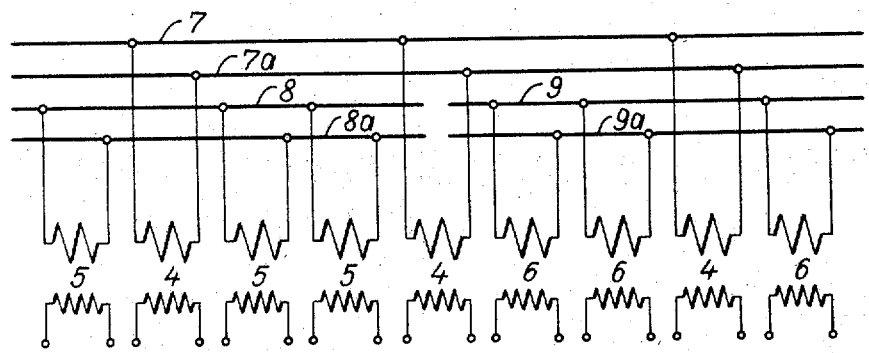
FIG. 2 is a wiring diagram in accordance with an embodiment of the invention.

Referring to FIG. 2, there is provided a pair of bus bars 7 and 7a which is connected to one phase of a three-phase network; the pair of bus bars 7 and 7a extends throughout the entire width of the grate welding machine. Parallel to the pair 7 and 7a there is arranged on one-half of the width of the machine, namely on the left one-half part of the machine, a pair of bus bars 8 and 8a; while on the right one-half side of the machine there is provided parallel to the bus bars 7, 7a and in alignment with the pair of bus bars 8, 8a, a third pair of bus bars 9 and 9a. As shown in FIG. 2, the pairs of bus bars are connected by means of transformers 4, 5 and 6 to the three phases of a multiphase network. The feeding of the through-going bus bars of the pairs 7, 7a is so arranged that this pair may carry a different welding voltage and, if need be, operate at a different welding time than the bus bar pairs 8, 8a and 9, 9a.

Figure 3:
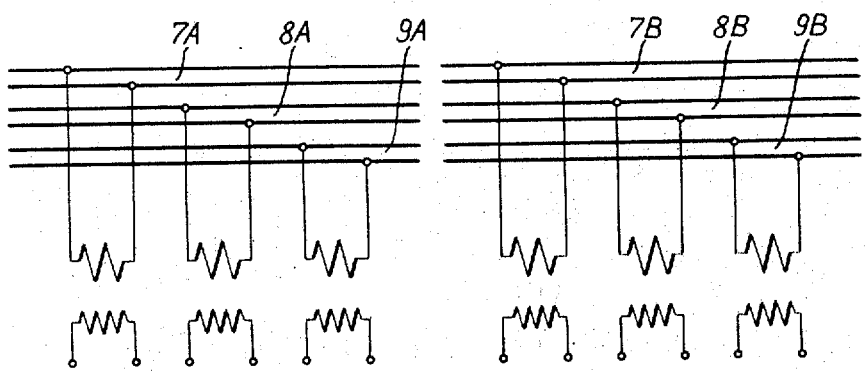
FIG. 3 is a modified wiring diagram.

In accordance with the modification of FIG. 3, all the bus bar pairs may be subdivided along the width of the machine into sections 7A, 8A, 9A and 7B, 8B, 9B, respectively. As shown in FIG. 3, more than two pairs of bus bars may be arranged, for instance three pairs, put parallel to each other. It is important that at each point of the width of the machine, there are available at least two pairs of bus bars, so that any electrode may selectively be connected to either one of these pairs of bus bars.

In FIGS. 4–7, there are shown ways of arranging the bus bars and of connecting the electrodes to the bus bars.

Figure 4:
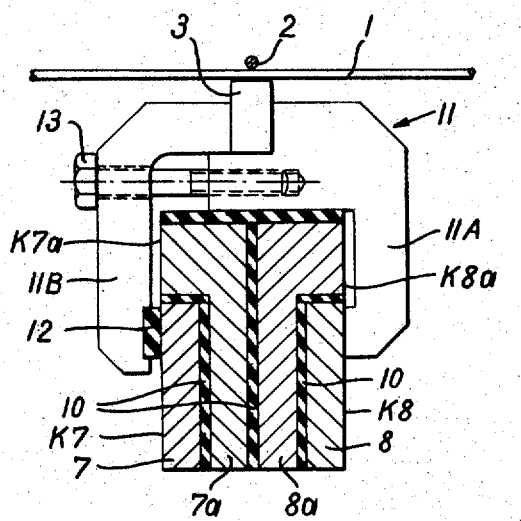
FIG. 4 is a large scale fragmentary sectional view of a bus bar arrangement in accordance with an embodiment of the invention, taken along a longitudinal wire of the grate, and showing a crosswire in cross section, showing a long legged rider making contact with the lower pair of bus bars.
Figure 5:
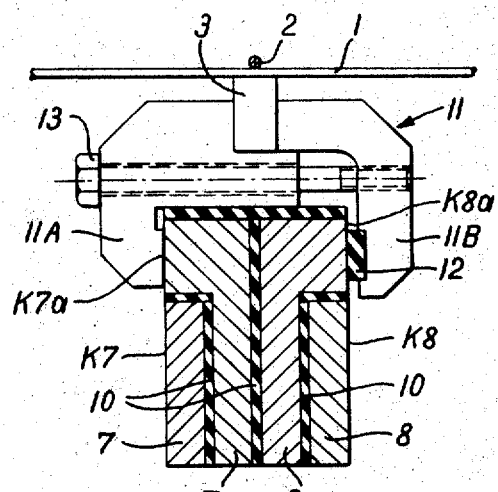
FIG. 5 is a fragmentary sectional view, similar to FIG. 4, showing the bus bar arrangement of FIG. 5, but with a short legged rider making contact, instead, with the upper pair of bus bars.

In accordance with the embodiment of FIGS. 4 and 5, the bus bars 7, 7a and 8, 8α are disposed closely adjacent each other, separated only by insulation 10. Each bus bar forms on one of its longitudinal sides a free contact surface K7, K7a and K8, K8a. The arrangement in FIGS. 4 and 5 is such that the free contact surfaces on each side are offset from each other vertically; thus, the contact surface K7a is above the surface K7 and, respectively, the contact surface K8a is above the surface K8. On each side, however, the vertically offset contact surfaces are flush.

Figure 6:
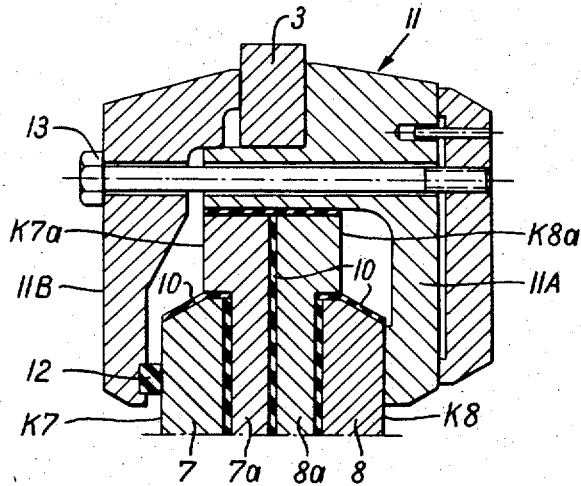
FIG. 6 is a fragmentary sectional view of a modified bus bar arrangement with a long legged rider making contact with the lower pair of bus bars.
Figure 7:
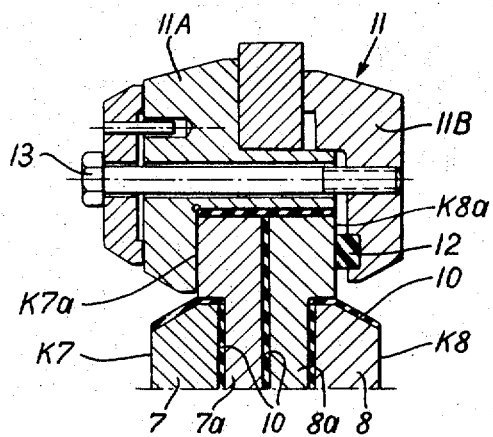
FIG. 7 is a fragmentary sectional view of the bus bar arrangement of FIG. 6, but with a short legged rider making contact, instead, with the upper pair of bus bars.

In contrast thereto, the free contact surfaces of the modifications of FIGS. 6 and 7 are not only offset from each other vertically, but also offset from each other horizontally; thus, the contact surface K8a is above and closer to the vertical central plane as compared to the surface K8, and the contact surface K7a is above and closer to the vertical central plane as compared to the surface K7.

In order to tap the current off the bus bars, there are provided electrode supporting riders 11. In the embodiments of FIGS. 4 and 5, the riders 11 may either have long legs 11A and 11B (FIG. 4), reaching down to the lower contact surfaces K7 and K8, respectively; or have short legs (FIG. 5), reaching to the upper contact surfaces K7a and K8a, respectively.

A bolt 13 holds the two parts of each rider 11 together. One of the legs of each rider 11 makes direct contact with a free surface of a bus bar, while the opposite side is separated from the free contact surface of its respective bus bar by means of an insulator 12. By turning the rider for 180°, the opposite bus bar may be tapped.

As shown in FIG. 4, the rider 11 makes contact with the surface K8 of the bus bar 8; by turning the rider 11 for 180°, contact would, instead, be made with the surface K7 of the bus bar 7.

In FIG. 5, on the other hand, the rider 11 is shown making contact with the surface K7a of the bus bar 7a; by turning the rider 11 for 180°, contact may, instead, be made with the face K8a of the bus bar 8a.

In a similar manner, contacts are made in the modifications of FIGS. 6 and 7, with changes possible by reversing the rider 11 for 180°.

The reversing for 180° of the rider 11 is rendered possible by the symmetrical arrangement of the bus bar groups of FIGS. 4, 5 and FIGS. 6, 7 about a central vertical plane. The riders 11 are movable longitudinally along the group of bus bars and can be mounted at any position along the width of the machine in such a manner that the electrodes thereof may receive current of a higher voltage or lower voltage, and/or amperage, and for a different welding time depending on the thickness of the longitudinal wires the electrode services.

As previously mentioned, it is also possible in accordance with the invention to connect the instant bus bar system in such a manner to the different phases of a three-phase network, so as to equalize the loads thereof even if grates are being welded which extend throughout less than the full width of the machine.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. In an electric current feeding device for use in a multiple spot resistance welding machine, having a plurality of electrodes arranged in one row and at least two pairs of bus bars arranged in parallel relationship along said row of electrodes, means operable for selectively interconnecting electrically each electrode to any of said bus bars, and means operable for selectively assigning to each pair of bus bars welding current of different characteristics, including voltage and duration of current application, said bus bars being arranged closely adjacent each other, insulation disposed between adjoining bus bars, each bus bar having a free elongated contact surface, said bus bars being so arranged that a bus bar of each pair having its free elongated contact surface facing in the same direction, though offset from, the free contact surface of a bus bar of the other pair, and means including an electrode supporting rider including two legs positionable to have one of its legs in electric conductive contact selectively with one of said surfaces, and insulating material restraining electric contact between the other leg with any other bus bar.

2. In an electric current feeding device, for use in connection with a multiple spot resistance welding machine having a plurality of electrodes arranged in at least one row, the combination of at least two pairs of bus bars arranged along said row, and means operable for selectively interconnecting electrically each electrode to a bus bar, said bus bars being disposed closely adjacent each other, insulation disposed between adjoining bus bars, each bus bar having a free elongated contact surface, said bus bars being so arranged that a bus bar of each pair having its free elongated contact surface facing in the same direction, though off-set from, the free contact surface of a bus bar of the other pair, said means comprising a rider in electric conductive contact with an electrode and including two legs positionable to have one of its legs in electric conductive contact selectively with one of said surfaces, and insulating material restraining electric contact between the other leg with any other bus bar.

3. In an electric current feeding device, as claimed in claim 1, said bus bars being arranged symmetrically about a central plane, whereby the contact surfaces of the two bus bars of each pair are on opposite sides of said plane at the same height, though differing in height from the contact surfaces of the other bus bars.

4. In an electric current feeding device, as claimed in claim 1, the contact surfaces of the bus bars of each pair being offset from the contact surfaces of the other bus bars horizontally and vertically.

5. In an electric current feeding device, as claimed in claim 1, the riders for different electrode pairs having different leg lengths and having the legs spaced apart for different distances.

References Cited
UNITED STATES PATENTS 3,125,668   3/1964   Eisenburger et al. _____ 219—87

RICHARD M. WOOD, *Primary Examiner.*

P. W. MAY, *Assistant Examiner.*

U.S. Cl. X.R.

219—88, 119